Nov. 28, 1950           J. C. DIONNE           2,531,413
METHOD AND APPARATUS FOR DETECTING FLAWS
Filed July 19, 1946           6 Sheets-Sheet 1
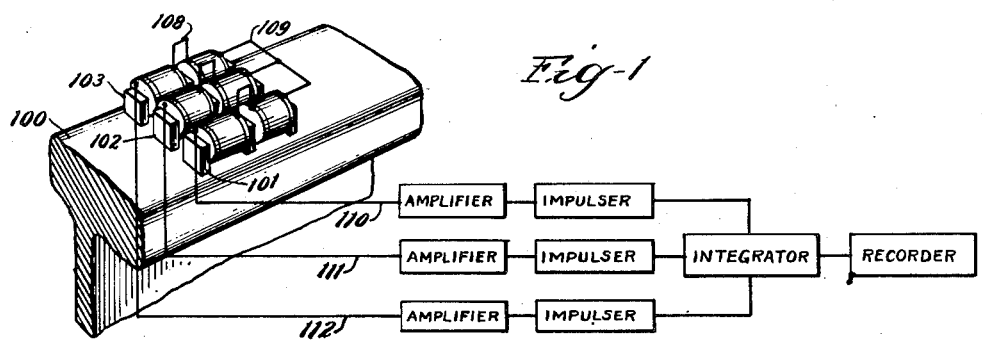
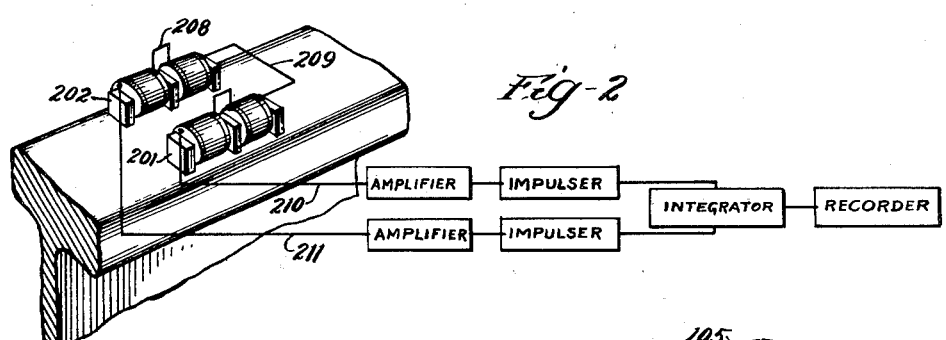
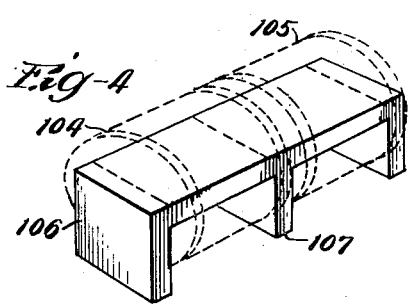
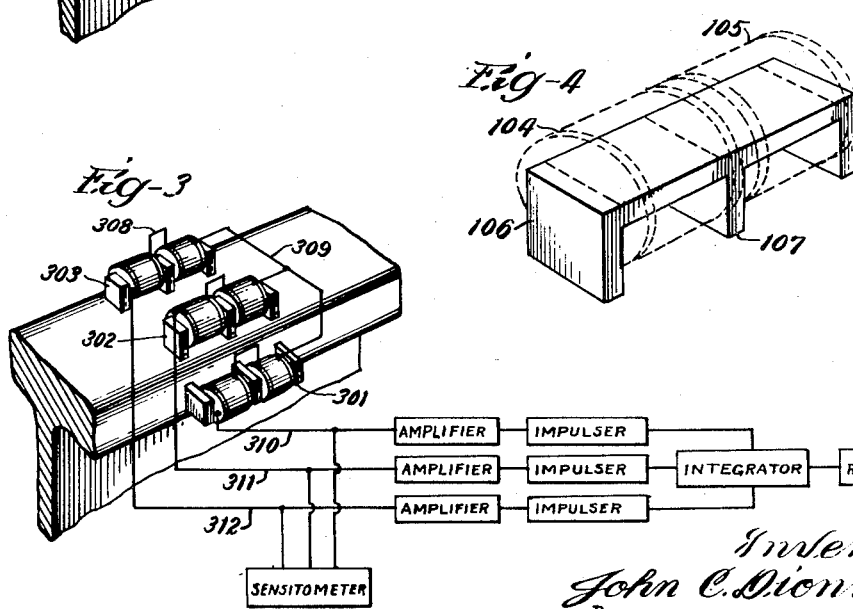
Inventor
John C. Dionne
By:— Mann and Brown
Atty's.

Nov. 28, 1950 J. C. DIONNE 2,531,413
METHOD AND APPARATUS FOR DETECTING FLAWS
Filed July 19, 1946 6 Sheets-Sheet 2
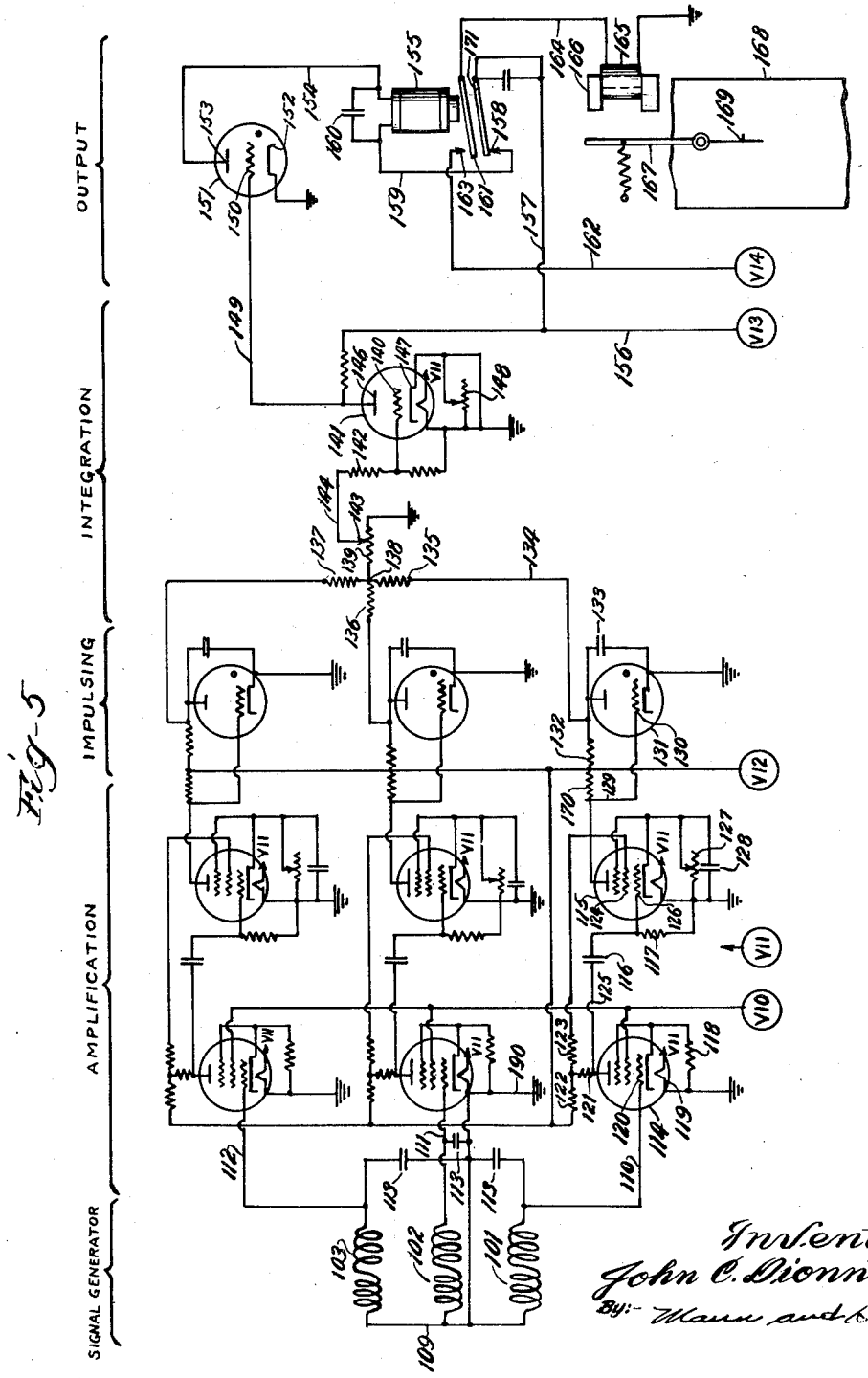

Nov. 28, 1950     J. C. DIONNE     2,531,413
METHOD AND APPARATUS FOR DETECTING FLAWS
Filed July 19, 1946     6 Sheets-Sheet 3
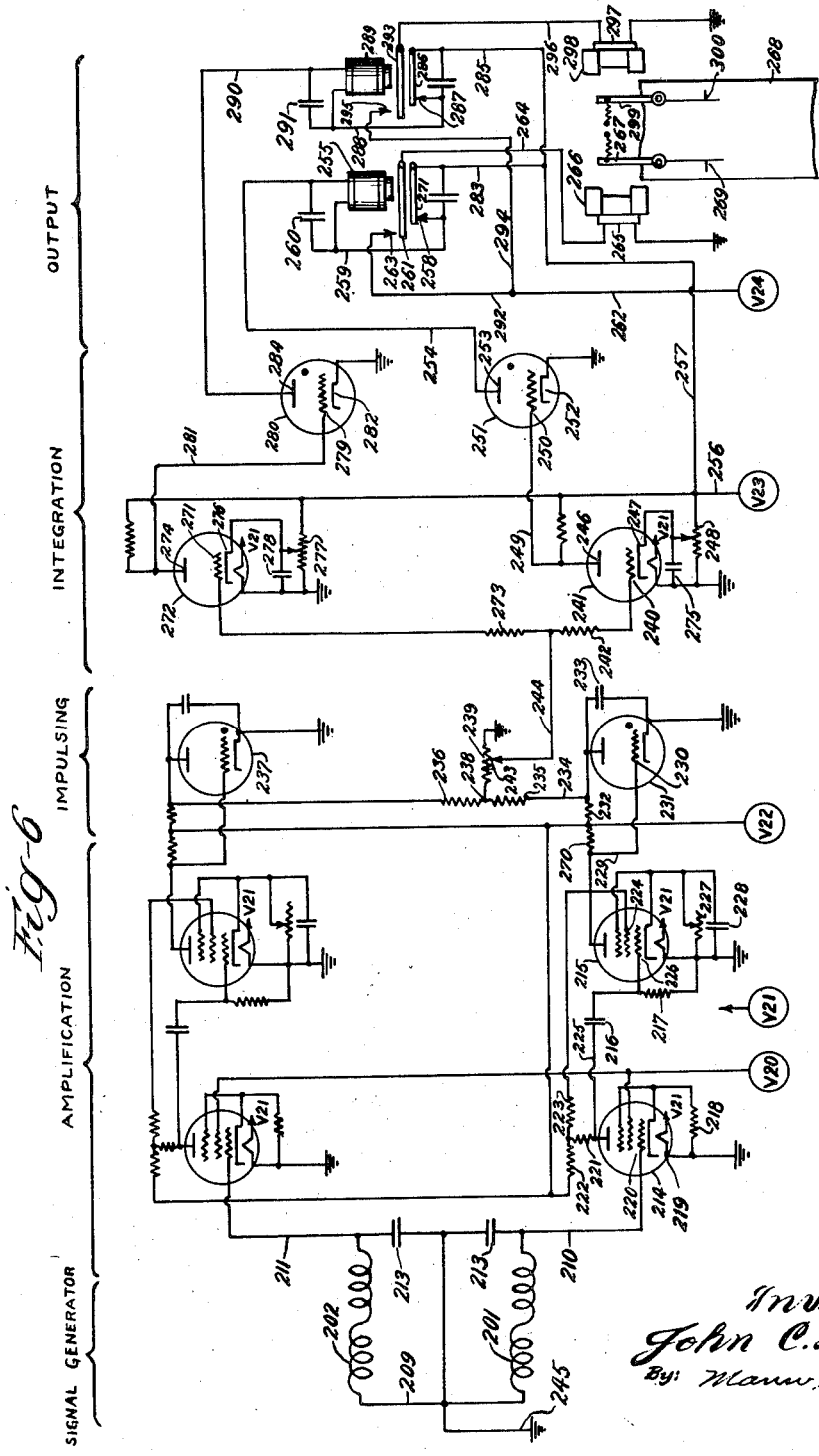

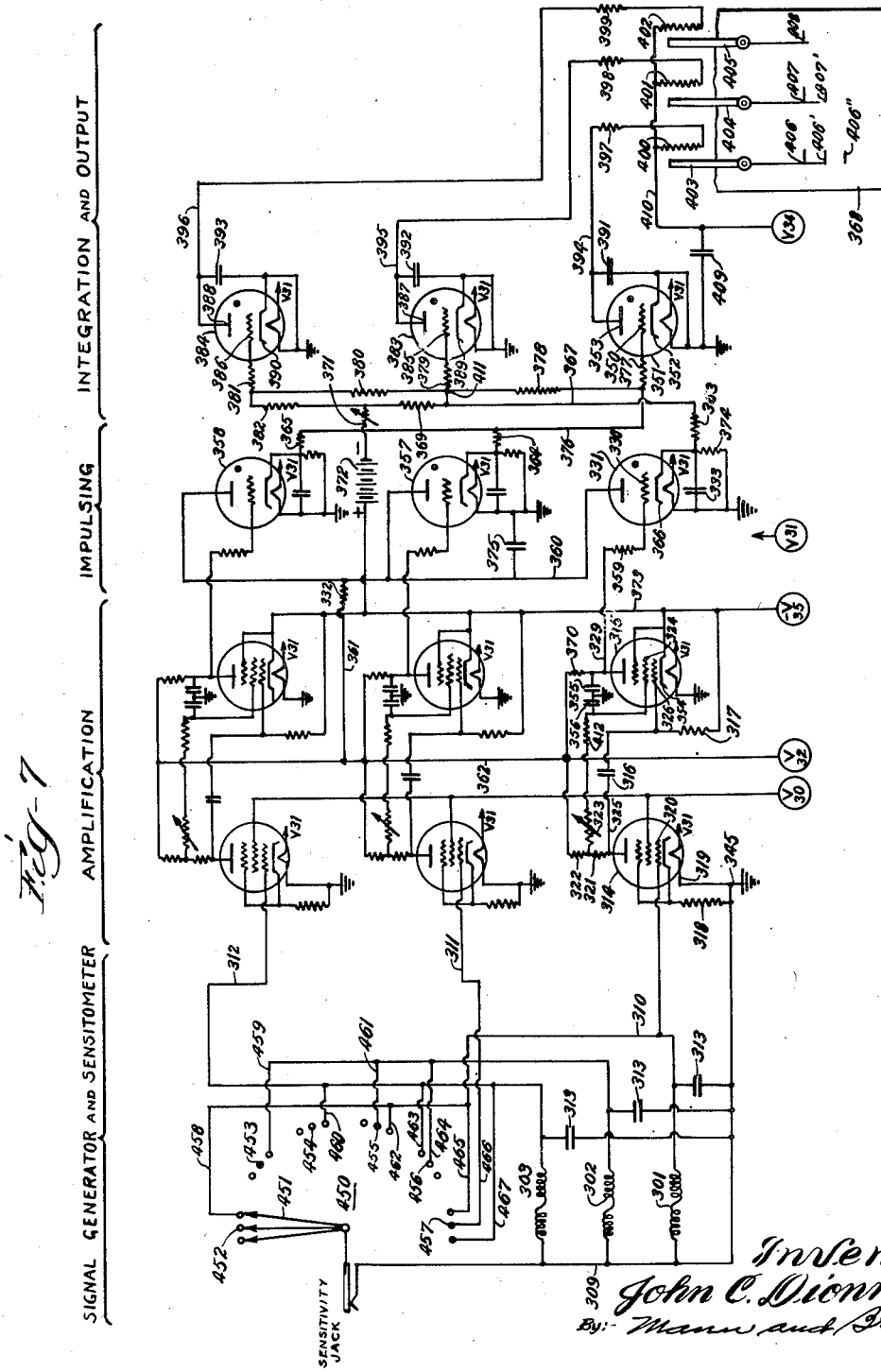

Nov. 28, 1950        J. C. DIONNE        2,531,413
METHOD AND APPARATUS FOR DETECTING FLAWS
Filed July 19, 1946        6 Sheets-Sheet 5
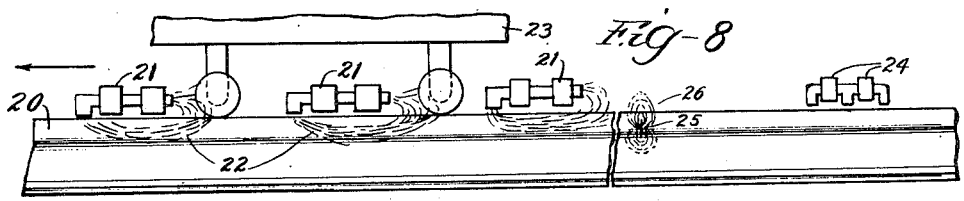
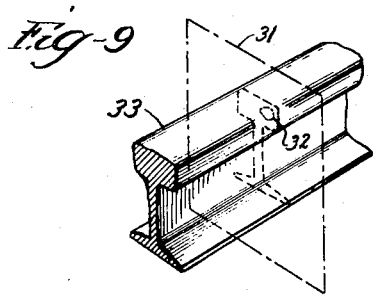
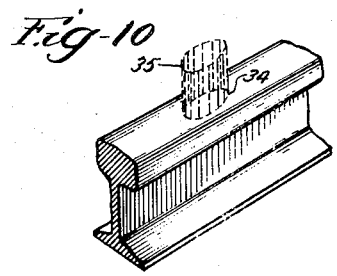
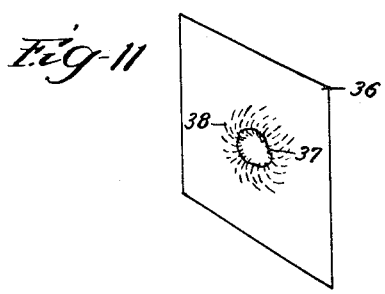
Inventor.
John C. Dionne
By Mann and Brown
Attys.

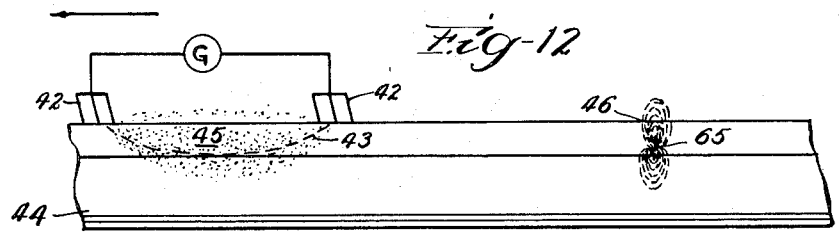
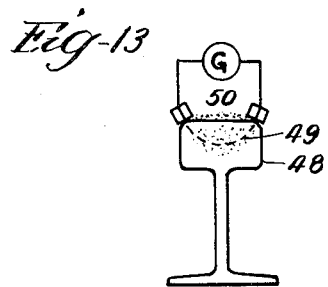
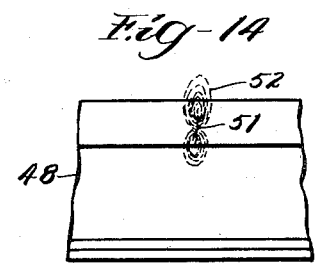
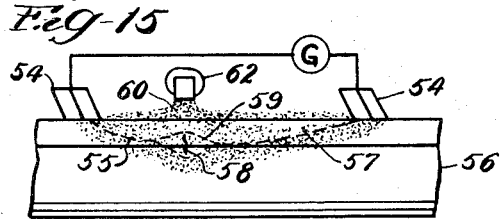
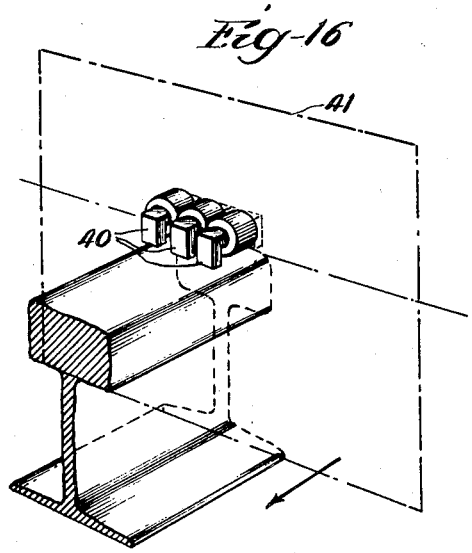
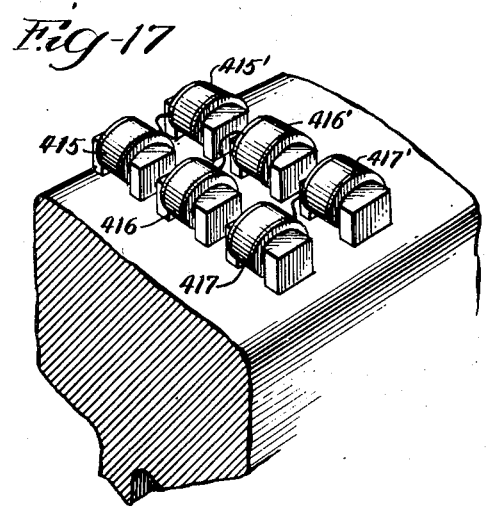

Patented Nov. 28, 1950

2,531,413

UNITED STATES PATENT OFFICE 2,531,413

METHOD AND APPARATUS FOR DETECTING FLAWS

John C. Dionne, Chicago, Ill.

Application July 19, 1946, Serial No. 684,660

25 Claims. (Cl. 175—183)

This invention relates to a method and apparatus for detecting flaws and more particularly to a method and apparatus for detecting flaws in a magnetizable body such as a railroad rail.

Transverse fissures are especially troublesome rail flaws. A true transverse fissure may be defined as a cross-wise progressive fracture originating within the metal (not on the surface) of the ball of the rail. Because they are not on the surface of the rail they cannot be detected by ordinary inspection, yet detecting is imperative if rail safety is to be preserved. When it is considered that transverse fissures and like flaws transverse of the rail axis make up approximately one-half of total rail flaws found and that immediate corrective action is required because of the tendency of even the smallest transverse fissure to grow rapidly and cause rail break, it can be seen that transverse fissure detection is a very important part of all rail flaw detection.

It is known in the prior art that when a relatively strong magnetic field is set up in a portion of a magnetizable body under test, such as a railroad rail, to cause it to be uniformly magnetized in a given direction and to overcome any magnetic condition that may have previously existed in that portion of the body, and then the energizing field is removed and the space around the body searched for traces of residual magnetism, it is found that flaws such as cracks, fissures and the like cause a peculiar magnetic condition to be set up which can be detected externally by suitable means. This is known to the art as the residual magnetism method of rail flaw detection and is disclosed in the Barnes et al. Patents No. 2,317,718, No. 2,317,719 and No. 2,317,720. Another method of rail flaw detection, based upon an entirely different principle, detects variations in the magnietic field around the rail while energized with current, and is known as the electro-inductive system. In the latter system a heavy current is passed longitudinally through a portion of the rail and flaws, if present, are detected by detecting changes in the magnetic field surrounding the rail caused by the flaws that are present.

Means for detecting magnetic conditions existing in the vicinity of flaws generally comprise inductive pickups movable along the magnetizable body, such as a railroad rail, and sensitive to the magnetic conditions existing in the vicinity of the flaw. These inductive pickups are so sensitive that they will often indicate superficial flaws or defects which do not require corrective action as well as true flaws or fissures which do require such action. Considering a railroad rail, for example, a wheel burn which is a surface defect produced by the spinning of a locomotive wheel on the top of a rail and which is usually found to be a spot formation of irregular contour on the top of the rail, may be considered to be a superficial flaw or defect. A transverse fissure, of course, would be a flaw which would require corrective action. There is no harm in recording both types of flaws as long as the record can be readily interpreted to distinguish the flaws which require immediate corrective action from those which do not require such action. Since interpretation of a record involves the human element, it is always preferable to have as "clean" a record as possible. That is, if the record consists of pen indications on a tape, to have a series of indications clearly spaced and clearly indicative of just what type of flaw is being recorded. With this type of record, less is left to the judgment of the person interpreting the record with the result that fewer hand tests are necessary and less time, hence expense, is involved in making test runs.

A hand test is a check test of a portion of the body under test suspected to contain flaws. When a portion of rail track is being tested, a test car is usually employed, and, if a hand test has to be made, the test car is stopped so that a crew member can get out and make such a test.

How, then, is one to obtain a "clean" record that will assure that fissures and like flaws transverse of the rail axis will be identified even if other faults or flaws are also recorded? I have found that one way to accomplish this desired result is to take advantage of a phenomenon characteristic of transverse fissures, and it should be understood that throughout the specification and claims the term "transverse fissure" includes in addition to the so-called true transverse fissure, which originates within the rail head, those fissures having transverse components which originate from a surface imperfection, sometimes called detailed fractures. It is found that all transverse fissures are practically always rectilinear and substantially at right angles to the longitudinal axis of the magnetizable body. Considering a railroad rail as the best example, one explanation for this transverse characteristic is that locomotive, or other railroad car, wheel pressure is applied transversely of the rail head, that is the wheel contacts the rail head across its surface, and compression and expansion resulting from the wheel running over the rail is applied axially of the rail. It is true that the fissure may lean in the direction of traffic but it will nevertheless be transverse to the longitudinal axis of the rail. If the rail was considered to be transparent and viewed from above, a transverse fissure would look like a hairline at right angles across the head of the rail. The length of the hairline would equal the distance between the sidereal limits of the fissure and the thickness of the line would be equal to the rail axial limits of the fissure which, of course, is a function of the leaning of the fissure with respect to the direction of traffic over the rail. Thus, the plane that the fissure would lie in would also be transverse to the longitudinal axis of the rail. Furthermore, as might be expected from this analysis, when the rail is magnetized to produce residual magnetism it is found that the characteristic magnetic condition existing in the vicinity of a flaw such as a transverse fissure can also be considered to have a peaked portion or crest, the summit of which lies in the fissure plane and hence this magnetic condition will be transverse of the longitudinal axis of the rail. To put it differently, the fissure plane instead of remaining confined to its own mechanical dimensions inside the ball of the rail is expanded indefinitely into space by means of the characteristic residual magnetic field. Wheel burns and other surface defects do not exhibit this characteristic planar type of magnetic condition. Vertical splits, although lying in planes parallel to the longitudinal axis of the rail, would not lie in planes transverse of the rail. Compound fractures would include transverse planar portions to the extent that they are composed of transverse fissures. I make reference hereafter in the detailed description to this transverse magnetic characteristic and offer an explanation of my understanding of the phenomenon.

My invention provides a means for detecting this magnetic characteristic of transverse fissures and for indicating the presence of such fissures in a body under test. In one form of my invention I obtain a flaw indication only when a magnetic condition characteristic of a transverse fissure is present. This might be termed a one-level indication i. e., an indication that is rejective of all flaws other than transverse fissures and which is acceptive of transverse fissure flaws. In another form of my invention I obtain clearly separable flaw indications for magnetic conditions characteristic of minor to medium and medium to major transverse fissures. This might be termed a two level flaw indication, one level being indicative of the presence of minor to medium transverse fissures and the other level being indicative of medium to major transverse fissures. In still another form of my invention I obtain clearly separable indications for minor, medium and major types of flaws considering magnetic conditions characteristic of medium and major transverse fissures as indicating medium and major flaws and magnetic conditions characteristic of localized wheel burns or small sided fissures as indicating minor flaws. This might be considered as a three level flaw indication means, the highest level being indicative of the more serious transverse fissures, the medium level being indicative of transverse fissures of less magnitude than those in the highest level, and the lowest level being indicative of small sided fissures which do not produce a magnetic condition strong enough to actuate either of the other level indicating means.

Accordingly, it is an object of my invention to provide a method and apparatus for obtaining an indication clearly indicative of the presence of transverse fissures in a magnetizable body, such as a railroad rail, under test irrespective of whether other flaw indications are also obtained. Other objects of my invention are to provide a method and apparatus for obtaining distinguishable flaw indications; to provide a method and apparatus for amplifying pickup responses and converting these responses into characteristic impulses; to provide a method and apparatus for integrating characteristic impulses to achieve selective actuation of flaw indicating means; and to provide a method and apparatus for obtaining distinguishable flaw indications in response to the integrator action.

Other objects and advantages of my invention will become apparent from the following detailed description taken in conjunction with the attached drawing in which Fig. 1 is a diagrammatic showing of a portion of a railroad rail with three pickups positioned abreast and on top of the upper surface of the rail and includes a block diagram of the electrical circuit components showing the arrangement of these components for actuating the recording means;

Fig. 2 is a showing similar to that of Fig. 1 wherein two pickups are shown positioned abreast and on the upper rail surface with a corresponding reduction in the number of components in the block diagram;

Fig. 3 is a showing similar to that of Fig. 1 in which the three pickups, although still positioned abreast, include one pickup on the side of the ball of the rail and two pickups, spaced apart, on the top of the rail. The block diagram of electrical circuit components is similar to that shown in Fig. 1 and includes a sensitometer block;

Fig. 4 is a perspective view of a pick-up suitable for use in practicing my invention;

Fig. 5 is an electrical circuit diagram of the arrangement disclosed in Fig. 1;

Fig. 6 is an electrical circuit diagram of the arrangement disclosed in Fig. 2;

Fig. 7 is an electrical circuit diagram of the arrangement disclosed in Fig. 3;

Fig. 8 is a diagrammatic showing of a portion of rail track being magnetized to produce a characteristic residual magnetic condition in the vicinity of a transverse fissure and illustrates schematically the relative location of the magnetizing members, the fissure and the pickup element;

Fig. 9 is a perspective illustration of a portion of rail track including a fissure and showing, in dotted outline, the plane in which the fissure lies;

Fig. 10 is a perspective illustration of a portion of railroad rail including a showing of a wheel burn configuration and vertical extensions from the periphery of the wheel burn;

Fig. 11 is a schematic showing of a plane including a transverse fissure and showing the intersection of the flux lines with this plane;

Fig. 12 is a diagrammatic showing of a portion of rail track in which a magnetic field is produced by contact elements which cause an electrical current to flow through the rail portion illustrated and a fissure, transverse, is illustrated with the character residual magnetic condition existing in the vicinity of the fissures represented;

Fig. 13 is a cross-sectional view of a portion of railroad rail showing electrical contact elements causing a current to flow through the rail transversely of the longitudinal axis of the rail and illustrating the magnetic field produced by this current;

Fig. 14 is a diagrammatic illustration of a portion of rail track including a transverse fissure which has been magnetized by an arrangement such as is illustrated in Fig. 15 and illustrates the magnetic condition existing in the vicinity of a transverse fissure;

Fig. 15 is a diagrammatic showing of a portion of a railroad rail having current passed therethrough by electrical contact elements and showing the magnetic condition existing in the vicinity of the transverse fissure located intermediate the electrical contact element;

Fig. 16 is a perspective illustration of a portion of railroad rail showing three pickups mounted abreast on top of the rail passing simultaneously through a plane which includes a transverse fissure; and Fig. 17 is a perspective illustration of a portion of railroad rail showing two groups of three pickups each, the pickups in each group being mounted abreast atop the rail with their cores transverse of the rail.

Referring to the drawings, Figs. 1–3 inclusive illustrate the inductive pickup arrangement and the corresponding electrical circuit component arrangement for three embodiments of my invention and Figs. 5–7 inclusive illustrate the respective electrical circuit diagrams for these three embodiments. Naturally the three embodiments shown are not exclusive of other means of practicing my invention and are chosen to illustrate the practice of my invention in conformance to patent statutes. However, before describing these respective embodiments in detail it is believed that the following explanation regarding the characteristics of the magnetic condition adjacent a transverse fissure will be helpful. All theoretical discussions in the explanation which follows are to be construed merely as an attempt to explain the advantageous results obtained in practicing my invention.

When a portion of railroad rail is energized, either by directly impressing a magnetic field onto the rail or by creating a magnetic field by passing a current through the rail, and when this energizing force is removed, it is found that the rail retains a certain amount of magnetism which is usually termed residual magnetism. Whatever the pattern of this residual magnetism may be, it is also known that this pattern is interrupted in the vicinity of flaws so that a discontinuity exists in the residual magnetism enabling one to detect the presence of flaws by detecting the discontinuity. Considering a transverse fissure as an example, it can be considered that the faces of the fissure form local north-south magnetic poles with a resulting magnetic flux path from one of these respective poles to the other. This local field then interrupts the presumably uniform residual magnetism pattern such that it can be detected, that is, the local field can be detected, externally. An illustration of this is found in Fig. 8 where a portion of track 20 is shown as being magnetized by three L-magnets 21 to create the magnetic flux flow indicated by the dotted lines 22. In practice, when railroad rails are being checked for flaws, a railway car known as a "detector" car is used to contain the detecting apparatus and the operating crew and to support the parts of the detecting apparatus that must be located adjacent the rail. Thus, in Fig. 8, a detector car portion is shown diagrammatically at 23 and this detector car will support the L-magnets 21 and the inductive pickup 24. The direction of motion is indicated by the arrow in this figure. After the L-magnets 21 pass over the transverse fissure indicated at 25, the residual field indicated by dotted lines 26 remains. Subsequently, inductive pickup 24 enters this residual field and is affected thereby to produce indications on the apparatus contained in the detector car. Thus, according to this illustration, the faces of the transverse fissure form local poles which create the residual magnetic condition enabling the flaw indication to be obtained with an inductive pickup.

Whatever view is adopted as an explanation of the phenomenon, it is known that the residual magnetic field existing in the vicinity of a transverse fissure has what may be termed a characteristic peaked portion or crest, the summit of which may be considered to lie in the fissure plane. Such a plane is indicated in dotted outline in Fig. 9 at 31 and includes the transverse fissure 32. Naturally, the plane that is illustrated is also transverse to the longitudinal axis of the rail member 33. By way of contrast, a wheel burn 34 is illustrated in Fig. 10 and it can be noted, from the lines 35 projected upward from the edges of the wheel burn, that here there is no characteristic transverse plane for a defect of this type. Fig. 11 illustrates the transverse plane per se at 36 including the fissure 37 and, if the view is taken that the faces of the fissure form local magnetic poles, then it can be seen that the plane 36 cuts across the magnetic lines 38 and that these lines intersect the plane all around the fissure. In effect, the magnetic lines expand the fissure into the plane surrounding it and naturally, this occurs above the surface of the rail also. Thus, the magnetic condition existing in the vicinity of a transverse fissure has a portion characteristic of the presence of the transverse fissure lying in the plane of the fissure.

From this it follows that if a plurality of inductive pickups of proper sensitivity are disposed substantially abreast and simultaneously moved through the transverse fissure plane, all will respond. This is illustrated in Fig. 16 where a plurality of inductive pickups 40 are shown advancing through the transverse fissure plane 41. If all of these pickups do not respond then it is because they have not all passed through a plane and hence there is no fissure, at least no fissure large enough to create a characteristic peaked planar type of magnetic condition, present. Responses received from individual inductive pickups can be integrated so that it takes a simultaneous response from each pickup to actuate an indicator. Thus, fissures would indicate and surface blemishes and other defects not possessing a characteristic planar type of magnetic condition through which the inductive pickups could simultaneously advance would not indicate. Or, as is better in practice, one can get other flaw indications and still have indications characteristic of transverse fissure. This can be done by proper integration of the inductive pickup impulses and selective actuation of the indicator in response to integrator action.

This planar type of magnetic field characteristic of a transverse fissure can be produced by energizing means other than the L-magnets illustrated in Fig. 8. Thus, for example, there is illustrated in Fig. 12 a pair of electrical contact brushes 42 which pass an electrical current, represented by the dotted line 43, through a portion of rail 44. The electrical current creates a magnetic field, indicated by the dots 45, which surrounds, and also lies in, the rail. As the brushes 42 move along the surface of the rail in a direction indicated by the arrow in this figure it is found that a residual field exists in the vicinity of a transverse fissure indicated at 65 and this residual field is peaked as is indicated by the dotted lines 46 from which it can be seen that the crest of the residual field lies in the plane of the transverse fissure.

In Fig. 13, a portion of rail 48 is illustrated as having a current 49 passed therethrough transversely of the rail and the magnetic field surrounding this current is indicated by the dotted lines 50. The residual magnetic field existing in the vicinity of a transverse fissure 51 located in the rail portion 48 which has had electric current passed through it in the manner shown in Fig. 13 is illustrated once again, in Fig. 14, by adopting the view that the magnetic field in the vicinity of the fissure is of the shape indicated by the dotted lines 52.

Even if flaw detection is practiced using the electroinductive method of flaw detection illustrated in Fig. 15, advantage can be taken of the planar magnetic characteristic of transverse fissures. Thus, in Fig. 15, a pair of electrical brushes 54 is shown as passing an electrical current represented by the dotted line 55 through a portion of rail 56. The magnetic field surrounding the electrical current path is represented by the dots 57. It will be noticed that the electrical path divides as it encounters the higher resistance of a transverse fissure 58. One path 59 of the electrical current goes near the top surface of the rail portion 56 thus creating an intensification of the magnetic field 57 above the rail as indicated at 60. When a transverse fissure is the flaw which obstructs the path of current flow between brushes 54, the intensified region of flux extends transversely of the rail. While the region of intensified flux, assuming a current path adjacent the top of the rail, is not considered to be as sharply peaked as a characteristic residual magnetic field in the vicinity of a fissure, the summit of the intensified flux region can still be considered to lie in the plane of the transverse fissure. It will be realized, of course, that the inductive pickups 62 will, although positioned substantially abreast, be positioned with their magnetic cores transverse to the longitudinal axis of the rail so that correct interception of the magnetic flux line can be made. Having thus offered an explanation of the magnetic condition characteristic of the presence of transverse fissures I will now give a detailed explanation of the respective embodiments of my invention which I have illustrated in the drawings.

*The embodiment illustrated in Figs. 1 and 5*

Referring to Fig. 1, three inductive pickups 101, 102 and 103 are shown positioned side by side and substantially abreast on the top surface of a portion of rail 100. The individual pickups are of such width that, collectively, when they are positioned as shown in Fig. 1, they will extend substantially across the width of the rail. When the pickups are used in rail testing they will normally be carried in a slidable shoe, not shown, that will be motivated by the detector car. Of course, the electrical components indicated in the block diagram forming a part of Fig. 1 will also be carried by the detector car.

An individual inductive pickup is illustrated in Fig. 4. It comprises two coils 104 and 105 connected by lead 108 and wound on an E-shape magnetic core 106. Coils 104 and 105 are oppositely wound with respect to core 106. Then, if magnetic flux enters the center leg 107 of core 106 and branches in opposite directions to the respective ends of the core, the voltages induced in coils 104 and 105 will be cumulative rather than bucking. This is the desired result. When the center leg 107 enters a region of higher flux density than do the end legs of the core member, a flux differential exists and magnetic flux flows through the core to produce cumulative voltage pulses as indicated above.

Returning to Fig. 1, it will be noted that one set of outgoing leads from the inductive pickups has a common connection at 109. In practice, this connection is usually grounded. The other outgoing leads, termed the output leads, are indicated at 110, 111 and 112. They feed into the respective amplifier channels as indicated in the block diagram. Details of the electrical components indicated in the block diagram are best obtained from Fig. 5.

In this figure, the electrical components are indicated as falling into the main groupings of signal generator, amplification, impulsing, integration and output. Up to the integration stage the details of the three individual channels indicated are substantially identical and, hence, only one channel will be described in detail it being understood that the description will apply equally well to the other two channels.

The three inductive pickups 101, 102 and 103 have a common connection 109 grounded at 190. Each pickup is shunted by a condenser 113 which bypasses stray radio frequency components that might affect the pickup operation. The individual pickup outputs are fed, through the respective output leads 110, 111 and 112, to the inputs of the respective amplifiers in the amplification stage. This, then, is the signal generator construction. In the following description of the amplification stage, the channel connected to the output of inductive pickup 101 is chosen for detailed description.

The amplification stage comprises a two stage resistance capacitance coupled amplifier employing pentode tubes 114 and 115. The coupling is loose i. e., the coupling condenser 116 and grid leak resistor 117 have low values. The reason for this is to prevent paralysis of the amplifier on overpowering signals such as are received when the inductive pickups pass over a rail joint. While rail defects might produce a signal as low as three millivolts, a ten volt signal can be produced by rail joints and, with tight coupling, the amplifier would be "blocked" for a considerable time interval following the passing of the rail joint because the coupling condenser would become highly charged and would take time to discharge. Thus, a rail defect closely following a joint, say, a few inches from the joint, would be missed because the coupling condenser would not be sufficiently discharged by the time the defect was reached. With my construction overpowering signals are quickly shunted to ground before "blocking" or paralysis can occur. Although this is achieved at some loss in amplification sensitivity, the loss of some sensitivity is the lesser of two evils.

In pentode 114, the suppressor grid is connected to the cathode in the conventional manner and cathode bias is obtained from resistance 118 in the conventional manner also. The cathode is indirectly heated by heater 119 which derives its voltage from voltage source V11. For simplicity of illustration the individual heater connection to the voltage source V11 has been omitted. The screen grid of pentode 114 obtains its bias from voltage source V10. Inductive pickup output lead 110 is connected to the control grid 120 of pentode 114. The plate circuit of pentode 114 contains plate resistances 121 and 122 and the screen grid resistance 123 for screen grid 124 of pentode 115 is connected to the plate circuit of pentode 114 intermediate the resistances 121 and 122.

The output of pentode 114 is fed, through lead 125 and coupling condenser 116, to the control grid 126 of pentode 115. In this pentode, the suppressor grid and cathode are connected in conventional manner and cathode bias is obtained from adjustable resistance 127 shunted by condenser 128. This, as will be understood to those skilled in the art, provides amplifier sensitivity control. Again, the cathode is indirectly heated as indicated. Output lead 129 from the plate circuit of pentode 115 is connected to the control grid 130 of thyratron tube 131 in the impulsing stage. The plate voltage supply for the plate circuits of pentodes 114 and 115 is obtained from the voltage source V12 with the connections as shown.

The impulsing stage consists of a thyratron tube 131 which trips, in response to a signal from the amplifier delivered on thyratron grid 130, to deliver a pulse to the integration stage. Thyratron plate voltage is derived from voltage source V12 through thyratron plate resistance 132. The thyratron plate and cathode are shunted by a quenching condenser 133 which acts in conjunction with resistance 132, in a manner known to those skilled in the art, to quench, or extinguish, the thyratron following delivery of a pulse. Obviously, control of the quenching interval can be obtained by varying the size of condenser 133.

Individual pulses from the thyratrons in the impulsing stage are delivered to the integration stage where they are combined for delivery to the output stage. Thus, thyratron output lead 134 is connected to resistance 135 which has a common junction at 138 with resistances 136 and 137, the latter resistances being connected, respectively, to the other two thyratron outputs as shown. Resistances 135, 136 and 137 are of fairly high value, one megohm being suitable, to isolate the channels from each other. A resistance 139 is connected between the junction point 138 and ground and grid potential for the grid 140 of triode 141 is obtained from resistance 139 through slidable contact 143, lead 144 and resistance 142. Plate voltage for the plate 145 of triode 141 is derived from voltage source V13 as shown. The indirectly heated cathode 147 has cathode bias provided by adjustable resistance 148 in the conventional manner.

The output of triode 141 is led to the grid 150 of thyratron 151 through lead 149. The cathode 152 of thyratron 151 is connected to ground. Voltage is impressed on the plate 153 from voltage source V13 through lead 156, lead 157, normally closed relay contacts 158, lead 159, relay 155 and lead 154. Thus, relay 155 is in series with the thyratron plate. A timing condenser 160 is in parallel with relay 155.

Relay 155 actuates armature 161 to complete a circuit from voltage source V14 through lead 162, contact 163, armature 161, lead 164 and pen actuating coil 165 to ground. Coil 165 energizes core 166 to attract the pivoted spring biased pen 167 and make a mark 169 on movable recording tape 168. Usually, although not shown here, when railroad rails are being tested a paint gun actuator will also be included in the output circuit to actuate a paint gun and squirt paint onto the rail where a defect is indicated. This enables follow-up crews to locate defects readily.

*Operation of the embodiment illustrated in Figs. 1 and 5*

In describing the amplification and impulsing stages only the channel connected to inductive pickup 101 will be used since the operation of the other two channels is identical.

The inductive pickups 101, 102 and 103 are so connected that, for normal forward movement of the detector car, voltage pulses delivered to the respective amplifier inputs are positive pulses. Thus, when inductive pickup 101 passes through a region of increased flux density, above a transverse fissure, for example, assume that a positive voltage pulse is impressed on the control grid 120 of pentode 114. Since phase reversal occurs between the grid and plate, this causes an amplified negative voltage pulse to be imparted, through the coupling condenser 116, to the control grid 126 of pentode 115. Again there is phase reversal between the grid and plate so that an amplified positive voltage pulse is impressed on the control grid 130 of thyratron 131.

To prevent plate voltage drift in the amplifier circuit, such as can be caused by fluctuations in the heater voltage, voltage source V11, and consequent changes in cathode emissivity, the screen grid 124 of pentode 115 is connected, through resistance 123, to the plate circuit of pentode 114 intermediate plate resistances 121 and 122. Then if the voltage varies in the plate circuit of pentode 114, the voltage of screen grid 124 likewise varies to keep the plate voltage of pentode 115 substantially constant. For example, if there was a change in the cathode heater voltage resulting in increased cathode emissivity, hence increased conduction through the tube, the plate voltage of both pentodes would tend to drop. However, plate voltage drop for the plate of pentode 115 is prevented because the plate voltage drop for pentode 114 lowers the potential of screen grid 124 which prevents increased conduction through pentode 115 hence maintaining the plate potential of that tube substantially constant. On decrease in cathode emissivity, tending to increase plate potentials of both pentodes, screen grid 124 causes increased conduction through pentode 115 to prevent voltage rise in the plate circuit of that pentode. Hence, voltage drift for the plate circuit of pentode 115 is prevented and this is a necessary result because grid 130 of thyratron 131 is at this plate potential.

The grid 130 of thyratron 131 is normally held at a voltage close to the thyratron tripping point. This is accomplished by maintaining the plate voltage of pentode 115 to which grid 130 is connected by lead 129, at the desired voltage by means of the cathode variable bias of said pentode. Hence a relatively small positive signal appearing in the plate circuit of this pentode will cause thyratron 131 to trip. It is obvious that the voltage range of grid 130 can be chosen as desired. When the thyratron trips, the thyratron plate voltage, hence the voltage of junction point 138 which is connected, through resistance 135 to the thyratron plate, drops. Also, when the thyratron 131 trips, condenser 133 discharges and, following discharge, the potential across thyratron 131, grid 130 meanwhile having gone down in potential, is insufficient to maintain conduction through the thyratron, hence the thyratron is quenched.

When the voltage of junction point 138 drops, the voltage of control grid 140 of triode 141 likewise drops since grid 140 is connected to junction point 138 through resistance 142, lead 144, and slidable contact 143 and resistance 139. However, the voltage drop on grid 140 produced by one inductive pickup, such as pickup 101, acting alone does not materially effect a rise in the voltage of plate 146 of triode 141 because this triode is normally operating on the substantially flat portion of its plate voltage-plate current characteristic curve and the grid voltage change produced by one inductive pickup acting alone still leaves the triode operating on the substantially flat portion of this curve.

Since impulse outputs of the other two channels, the channels fed by inductive pickups 102 and 103, are also impressed on junction point 138 and hence on control grid 140 of triode 141 and since the operation of these other two channels is identical to that of the channel fed by pickup 101, it is obvious that the voltage of junction point 138 and hence the voltage of control grid 140, will be lowered, as compared to single channel action, twice as much by two channel action and three times as much when all three channels act. When only two channels act, the doubly lowered potential of control grid 140 of triode 141 still leaves this tube operating on the substantially flat portion of its plate voltage-plate current characteristic curve and hence there is still no material increase in the potential of plate 146. What increase there is is insufficient to trip thyratron 151. However, when all three channels act simultaneously, the potential of grid 140 is lowered sufficiently so that triode 141 no longer is operating on the substantially flat portion of its plate voltage-plate current characteristic curve and the potential of plate 146, hence the potential of control grid 150 of thyratron 151, rises sufficiently to trip this thyratron.

When thyratron 151 trips, a circuit is completed from voltage source V13 through relay 155 to ground. This circuit is from voltage source V13, through lead 156, through lead 157, through armature 171, through normally closed contact 158, through lead 159, through relay 155, through lead 154 and through thyratron 151 to ground. Thus, relay 155 is actuated and attracts armatures 171 and 161 thereby simultaneously breaking the circuit through the relay at 158 and making a circuit through the pen actuating coil 165 at 163. The latter circuit is from voltage source V14, through lead 162, through normally open contact 163, through armature 161, through lead 164 and coil 165 to ground. Normally, since relay 155 breaks its own circuit it would immediately drop back. However, immediate drop back is prevented by condenser 160 which requires time to discharge through relay 155. This discharge time provides the time interval for actuation of pen 167 since relay 155 is held in actuated position during discharge period. Control of the time interval during which coil 165 is energized can be obtained by choosing a condenser 160 having a discharge rate corresponding to the time interval desired. When the circuit through relay 155 is broken the circuit through thyratron 151 is likewise broken hence this thyratron is quenched.

When coil 165 is energized it magnetizes a core 166 which attracts pivoted spring biased pen 167. When this pen is attracted it makes a mark 169 on movable tape 168. In practice, tape 168 moves slowly in its longitudinal direction and the pen mark is transverse to this longitudinal movement.

After condenser 160 discharges relay 155 no longer has sufficient current therethrough to attract armatures 161 and 171. Hence, these armatures drop back, either under the action of gravity, or positive spring bias if desired, to re-establish the original circuit. Thus the circuit is ready to receive another simultaneous impulse from the three inductive pickups 101, 102 and 103.

From the foregoing it will be seen that a pen indication is received on the tape 168 only when all three pickups 101, 102 and 103 simultaneously feed a voltage pulse into their respective amplifier inputs. Such action can only occur when these pickups simultaneously pass through a region of flux density which causes them to generate a voltage signal and, since the pickups are of identical size and are positioned substantially abreast and side by side across the top surface of the rail, this calls for a region of flux density which extends across the rail surface transverse to the longitudinal axis of the rail, in other words, a peaked type of magnetic field planar in nature, as described heretofore in this specification. Also, as previously described, this type of magnetic condition is characteristic of transverse fissures but not of other defects. Hence, when a pen indication is received, it indicates that the defect is a transverse fissure.

To further restrict the possibility that defects other that transverse fissures will record, the overall sensitivity of the respective channels connected to pickups 101, 102 and 103 is adjusted so that magnetic conditions characteristic of transverse fissures of 20% value and up will cause an indication while those characteristic of transverse fissures of lesser value than 20% normally will not cause an indication. A 20% transverse fissure is one in which the fissure area is 20% of the area of the ball of the rail. Cross-sectional area is the area referred to.

*The embodiment illustrated in Figs. 2 and 6*

In this embodiment, it will be noted that there are two inductive pickups and two electrical component channels instead of the three shown in Figs. 1 and 5. However (see Fig. 2), inductive pickups 201 and 202, although substantially abreast, are spaced apart so that they effectively span the width of the rail. The spacing will be chosen so that each pickup "covers" half of the width of the rail that is primarily responsive to changed magnetic conditions existing in its half width of the rail. Since the pickups are spaced apart both will be affected by a changed magnetic condition only when that condition extends transversely of the rail and substantially the width of the rail so that both pickups intercept the magnetic field simultaneously. Hence, simultaneous action indicates that a transverse peaked type of magnetic condition is present, as is characteristic of transverse fissures. In addition, however, it is also possible to get individual responses from the individual pickups caused by magnetic conditions existing in each half width of the rail only as will be explained hereafter.

Because the embodiment shown in Figs. 2 and 6 has the same construction for the individual electrical component channels as does the embodiment shown in Figs. 1 and 5, the numbering used to illustrate components in Figs. 2 and 6 has been made to correspond, where possible, to the numbers used in illustrating the components for Figs. 1 and 5 using the 200 series of numbers with the same ending digits to indicate like parts.

Thus, the individual pickups 201 and 202 are of the type illustrated in Fig. 4, which has been described heretofore, and have oppositely wound coils connected at 208. One set of outgoing leads from the pickups has a common connection at 209 which is normally grounded. The output leads 210 and 211 feed into the respective amplifiers as indicated.

Referring to Fig. 6, the electrical components are indicated once again as falling into the main groupings of signal generator, amplification, impulsing, integration and output. Only the channel fed by pickup 201 will be described in detail as the other channel is identical.

The two inductive pickups 201 and 202 have the common connection 209 grounded at 245. Each pickup is shunted by a condenser 213 which bypasses stray radio frequency components that might affect pickup operation. The individual pickup outputs are fed, through leads 210 and 211 to the input of the respective amplifiers in the amplification stage. This is the signal generator construction.

The amplification stage comprises a two stage resistance-capacitance coupled amplifier employing pentode tubes 214 and 215. As was described for the embodiment illustrated in Figs. 1 and 5, the coupling between the two stages of the amplifier is loose i. e., the coupling condenser 216 and grid leak resister 217 have low values. This, as has been explained, prevents paralysis of the amplifier on overpowering signals such as can be received from rail joints.

In pentode 214 the suppressor-grid is connected to the cathode in the conventional manner and cathode bias is obtained from resistance 218 in conventional manner. The cathode is indirectly heated by heater 219 which derives its voltage from voltage source V21. For simplicity of illustration the individual heater connections to the voltage source V21 have been omitted. The screen grid of pentode 214 obtains its bias from voltage source V20 as shown. Pickup output lead 210 is connected to control grid 220 of pentode 214. The plate circuit of pentode 214 contains plate resistances 221 and 222 and the screen grid resistance 223 for screen grid 224 of pentode 215 is connected to the plate circuit of pentode 214 intermediate the resistances 221 and 222.

The output of pentode 214 is fed through lead 225 and coupling condenser 216 to the control grid 226 of pentode 215. In this pentode, the suppressor grid and cathode are connected in conventional manner and cathode bias is obtained from adjustable resistance 227 shunted by condenser 228. This, as will be understood to those skilled in the art, provides amplifier sensitivity control. Again, the cathode is indirectly heated as indicated. Output lead 229 from the plate circuit of pentode 215 is connected to the control grid 230 of thyratron tube 231 in the impulsing stage. The plate voltage supply for the plate circuits of pentodes 214 and 215 is obtained from voltage source V22 with connections as shown.

The impulsing stage consists of a thyratron tube 231 which trips, in response to a signal from the amplifier delivered on grid 230, to deliver a pulse to the integration stage. Thyratron plate voltage is derived from voltage source V22 through thyratron plate resistance 232. The thyratron plate and cathode are shunted by a quenching condenser 233 which acts in conjunction with resistance 232, in a manner known to the art, to quench, or extinguish, the thyratron following delivery of a pulse. Obviously, the quenching interval can be controlled by varying the size of condenser 233.

Individual pulses are delivered to the integration stage where they are combined for delivery to the output stage. Thus, thyratron output lead 234 is connected to resistance 235 which has a common junction at 238 with resistance 236, the latter resistance being connected to the other thyratron output as shown. Resistances 235 and 236 are of fairly high value, one megohm being suitable, to isolate the channels from each other. A resistance 239 is connected between junction point 238 and ground and grid potential for the grids 240 and 271 of triodes 241 and 272 is obtained from resistance 239 through slidable contact 243, lead 244, and resistances 242 and 273. Plate voltage for the plates 246 and 274 of triodes 241 and 272 is derived from voltage source V23 as shown. Cathode bias for the cathode 247 of triode 241 is provided by adjustable resistance 248 shunted by the condenser 275 and similarly cathode bias for the cathode 276 of triode 272 is provided by the adjustable resistance 277 shunted by condenser 278. Each cathode is indirectly heated and, as will be understood to those skilled in the art, it is possible to vary the sensitivity of triodes 241 and 272 by suitable adjustment of the cathode resistors 248 and 277.

The output of triode 241 is led to grid 250 of thyratron 251 through lead 249 and the output of triode 272 is led to grid 279 of thyratron 280 through lead 281. Both thyratron cathodes 252 and 282 are grounded. Voltage is impressed on plate 253 from voltage source V23 through lead 256, lead 257, lead 283, armature 271, normally closed contact 258, lead 259, relay 255, and lead 254. Thus, relay 255 is in series with thyratron 251. A timing condenser 260 is in parallel with relay 255. Similarly, voltage is impressed on plate 284 of thyratron 280 from voltage source V23 through lead 256, lead 257, lead 285, armature 286, normally closed contact 287, lead 288, relay 289 and lead 290. Thus, relay 289 is in series with thyratron 280. A timing condenser 291 is in parallel with relay 289.

Relay 255 actuates armature 261 to complete a circuit from voltage source V24 through lead 262, lead 292, normally open contact 263, armature 261, lead 264 and pen actuating coil 265 to ground. Coil 265 energizes magnetic core 266 to attract pivoted spring biased pen 267 and make a mark 269 on movable recording tape 268. Similarly, relay 289 actuates armature 293 to complete a circuit from voltage source V24 through lead 262, lead 294, normally open contact 295, armature 293, lead 296 and pen actuating coil 297 to ground. Coil 297 energizes magnetic core 298 to attract pivoted spring biased pen 299 and make a mark 300 on the movable recording tape 268. Usually, although not shown here, when railroad rails are being tested, a paint gun actuator will also be included in the output circuit to actuate a paint gun and squirt paint onto the rail where a defect is indicated. Follow-up crews are thereby enabled to locate by visual inspection, the location of such defects.

Operation of the embodiment shown in Figs. 2 and 6

From the description of the operation of the embodiment shown in Figs. 1 and 5 and the similarity between the channel circuits of Figs. 1 and 5 and Figs. 2 and 6, it will be seen that positive voltage pulses produced by pickups 201 and 202 will actuate the impulsing thyratrons 231 and 237 to lower the voltage of junction point 238 and hence lower the voltage of triode control grids 240 and 271.

When only one inductive pickup, either 201 or 202, generates a voltage signal, the voltage of junction point 238 and hence the voltage of triode control grids 240 and 271 will not be lowered as much as when both pickups generate a voltage signal. However, triode 241 is biased to be responsive to a single pickup signal, from either pickup 201 or 202, and will trip thyratron 251 which actuates relay 255 which, in turn, causes actuation of pen 267 which makes pen mark 269 on the movable tape 268. Triode 272 is not responsive to a single pickup signal, i. e., the signal generated by either pickup 201 or 202 acting alone will not lower the voltage of grid 271 enough to cause the potential of plate 274, and hence the potential of thyratron grid 279, to rise sufficiently to trip thyratron 280. However, when both pickups 201 and 202 generate a voltage signal simultaneously, the voltage of triode grid 271 is lowered sufficiently to raise the potential of plate 274, and hence the potential of thyratron grid 279, sufficiently to trip thyratron 280. When thyratron 280 trips, relay 289 is actuated which, in turn, causes actuation of pen 299 which makes a pen mark 300 on the movable tape 268. Obviously, on a joint pickup signal, triode 241 also acts, in the manner heretofore explained, to cause actuation of pen 267 which makes a pen mark on the tape simultaneously with the making of a pen mark by pen 267. Details of the operation of relay 255 and its associated pen actuating coil 265 and relay 289 and its associated pen actuating coil 297 are omitted here since their operation is the same, including the functioning of timing condensers 260 and 291, as the operation of the corresponding relay 155 and pen actuating coil 165 explained for the embodiment shown in Figs. 1 and 5.

Thus, either individual or joint pickup signal generation is detected and recorded, distinguishably, with the embodiment of my invention shown in Figs. 2 and 6. Adjustable control of the relative sensitivities of triodes 241 and 272 enables the selective action to be obtained. When joint pickup signal generation is obtained, thus causing pen 299 to make a mark on the recording tape, it indicates that both pickups have simultaneously passed through a region of flux density which causes them to generate a voltage signal. Since the pickups are of identical size and are substantially abreast and spaced apart to cover the width of the top of the rail, they must necessarily have passed through a region of flux density which extends across the top surface of the rail transversely through the longitudinal axis of the rail, in other words, a peaked type of magnetic field with the summit of the peak or crest lying in the transverse fissure plane as described heretofore in this specification. Also, as previously described, this type of magnetic condition is characteristic of transverse fissures but not of other defects. Hence when a pen indication is received from pen 299, it indicates that the defect is a transverse fissure.

When single pickup signal generation is obtained, thus producing a pen mark on the recording tape from pen 267 only, this indicates that an individual pickup has passed through a region of flux density which causes voltage generation and which exists primarily above the half width of the top of the rail traveled by the pickup affected and being too weak above the half width of the top of the rail traveled by the other pickup to cause the latter to generate a signal sufficiently strong to cause an indication. A very small transverse fissure localized on one side or the other of the rail or a burn or other surface defect likewise localized could cause such a magnetic condition and a single tape marking is interpreted as indicating such a flaw.

For better selective action, the overall sensitivity of the respective channels connected to pickups 201 and 202 is adjusted so that magnetic conditions characteristic of 20% transverse fissures and larger will cause an indication from pen 299 while magnetic conditions characteristic of transverse fissures less than 20%, or defects producing magnetic conditions similar thereto, will cause an indication from pen 267 only.

The embodiment shown in Figs. 3 and 7

In this embodiment elements corresponding to the elements in the previous two embodiments are numbered in the 300 series with ending digits corresponding, where possible, to the ending digits of like elements in the two previous embodiments. Thus, three inductive pickups 301, 302 and 303 are positioned substantially abreast with two pickups, 302 and 303 located atop the rail and spaced apart, similarly to the pickups 201 and 202 shown in Fig. 2, and the third inductive pickup, 301, is located on the side of the ball of the rail. In rail testing parlance, pickup 301, positioned as it is, is termed "nob pickup" and travels along the gauge side of the rail which is free from obstruction since it must accommodate the flange of a railroad car wheel.

The individual pickups are similar to that illustrated in Fig. 4. The oppositely wound coils of each pickup are connected together at 308 and one set of outgoing leads has a common connection at 309. The other set of outgoing leads, termed the output leads, 310, 311 and 312, feeds into the respective amplifiers as shown.

Referring to Fig. 7, the main headings are indicated as signal generator and sensitometer, amplification, impulsing, and integration and output. For the amplification and impulsing stages only the channel fed by pickup 301 is described in detail as the other two channels are the same as this one.

The signal generator comprises the three pickups 301, 302 and 303 each of which is shunted by a condenser 313 which bypasses stray radio frequency components which might affect pickup action. The three pickups have a common connection at 309 which is grounded at 345. The individual pickup output leads 310, 311 and 312 are connected, respectively, to the control grids of the pentodes forming the first stage of the amplifier. Thus, output lead 310 is connected to control grid 320 of pentode 314.

Each pickup output lead 310, 311 and 312, and hence each pentode control grid in the first amplifier stage, and the common connection 309 are all connected to the sensitometer assembly 450. A sensitometer of the type described and claimed in a pending application, Ser. No. 517,964, filed Jan. 12, 1944, now abandoned, is plugged in at the sensitivity jack for use with the sensitivity assembly 450, and the disclosure of said application, Ser. No. 517,964, is hereby incorporated by reference. The sensitometer assembly 450 is shown as having a six position switch arrangement including a three arm movable contact assembly 451 and six groups of three stationary contacts 452, 453, 454, 456, 455 and 457. One contact of group 452 is connected, by lead 458, to output lead 310. One contact of group 453 is connected, by lead 459, to inductive pickup 302 output lead 311. One contact of group 454 is connected, by lead 460, to inductive pickup 303 output lead 312. One contact of group 455 is connected, by lead 461, to output lead 311 and another contact of group 455 is connected by lead 462 to output lead 310. One contact of group 456 is connected by lead 463 to output lead 312 and another contact of group 456 is connected by lead 464 to output lead 311. The three contacts of group 457 are connected respectively by leads 465, 466 and 467 to output leads 310, 311 and 312. With this arrangement it is possible to check the sensitivity of the individual channels connected to individual pickups, to check the integrating action for the pairs of channels fed respectively by the pair of pickups 301 and 302 and 302 and 303, and to check the integrating action for three channels. Further information regarding the manner of using the sensitometer and the principles of its operation can be obtained from the aforementioned pending application Serial No. 517,964.

Once again a two stage resistance-capacitance coupled amplifier is provided employing pentode tubes 314 and 315. The coupler condenser 316 is of low value thus providing loose coupling for the reason explained in connection with the embodiment illustrated in Figs. 1 and 5. In pentode 314, the suppressor grid is connected to the cathode in conventional manner and cathode bias is obtained from resistance 318 in conventional manner. The cathode heater 319 derives its voltage from voltage source V31 and the individual connections from each heater to this voltage source are omitted for simplicity of illustration of wiring. Voltage source V30 furnishes the bias for the screen grids of the amplifiers in the first stage as is illustrated. The plate circuit of pentode 314 contains plate resistances 321 and 322 and adjustable screen grid resistance 323 for screen grid 324 of pentode 315 is connected to the plate circuit of pentode 314 intermediate the resistances 321 and 322.

The output of pentode 314 is fed, through lead 325 and coupling condenser 316 to the control grid 326 of the pentode 315. This control grid is also connected, through resistance 317, to the negative voltage source —V35 to which the cathodes, such as cathode 354 of the pentodes in the second stage of the amplifiers are also connected. Thus cathode 354 is negative and resistance 317 bleeds grid 326 to cathode potential. Hence grid to cathode bias is effectively zero. The suppressor grid is connected to the cathode in conventional manner. Once again the cathodes are indirectly heated as indicated. Plate voltage supply for the plate circuits of pentodes 314 and 315 is obtained from voltage source V32 with connections as shown. Stabilizing condensers 355 and 356 are connected respectively between plate and ground and screen grid and ground.

The impulsing stage includes three identical thyratrons 331, 357 and 358 of which only thyratron 331, in the channel fed by pickup 301, will be described in detail. Thyratron grid 330 is connected to the plate circuit of pentode 315 through grid resistor 359 and lead 329. Thus, control of thyratron tripping is exercised by the output of the amplifier stage including pentode 315. Thyratron plate voltage is derived from voltage source V32 through lead 360, resistance 332, lead 361 and lead 362. In quiescent state, the thyratron cathode 366 is near ground potential by virtue of its connection to ground through comparatively low resistance 374, and because of the comparatively high value of the resistances intermediate the cathode and the negative side of battery 372. When thyratron 331 conducts, however, cathode 366 becomes highly positive by virtue of the IR drop across resistance 374. The positive side of battery 372 is connected, through lead 373, to the negative voltage source —V35. Cathode 366, which is indirectly heated as indicated, is shunted to ground by a condenser 333 which acts, in conjunction with resistance 374, to drive the cathode highly negative following delivery of a pulse by the thyratron and hence quench the thyratron. A high value ballast condenser 375 is provided intermediate the plates of all of the thyratrons in the impulsing stage and ground as indicated. Each thyratron has an output resistance these being resistance 363 for thyratron 331, resistance 364 for thyratron 357, and resistance 365 for thyratron 358. All of these resistances are high value resistances, in the order of megohms, and while the resistances 364 and 365 are preferably equal, resistance 363 is of a higher value than either of these.

Since both resistances 364 and 365 are connected to lead 376, output pulses from either thyratron 357 or 358, or both, are delivered to lead 376 and hence to the control grids 350, 385 and 386 of thyratron 351, 383 and 384, respectively, through the resistance network shown. Similarly the output of thyratron 331 is delivered through resistance 363 through lead 367, and through the resistance network, to the respective control grid of each of the three thyratrons in the integration and output circuit. The resistance network interconnecting the three control grids 350, 385 and 386 is also connected through resistances 369, 382 and adjustable resistance 371, to the negative side of battery 372. Thus, these control grids are normally biased negative and the effect of the impulse outputs delivered from the impulsing stage is to make them more positive and, hence, cause firing of the thyratrons 351, 383 and 384.

Each thyratron plate 353, 387 and 388 derives its voltage from voltage source V34. Thus, thyratron plate 353 is connected through lead 394, resistance 397, pen actuating coil 400, and lead 410 to voltage source V34. The thyratron cathodes 352, 389 and 390 are grounded. A condenser which serves both as a time interval control and a quenching control is connected from plate to cathode for each thyratron. Thus, condenser 391 is connected from the plate 353 to the cathode 352 of thyratron 351 and condensers 392 and 393 are similarly connected for thyratrons 383 and 384. A high value ballast condenser 409 is connected from voltage source V34 to ground.

In this embodiment it will be noticed that each of the pivoted pens 403, 404 and 405 is actuated by an individual coil such as coil 400 for pen 403, coil 401 for pen 404 and coil 402 for pen 405. Coil 400 is energized directly by the action of thyratron 351, without an intermediate relay such as was used in the other embodiments, and similarly coil 401 is actuated directly by thyratron 383 and coil 402 is actuated directly by thyratron 384. Thus, in effect, the pens are driven directly by the thyratrons. The individual pens are arranged to make the marks 406, 407 and 408 as indicated.

*Operation of the embodiment shown in Figs. 3 and 7*

From the discussion of the operation of the two embodiments previously described, it will be seen that when a positive voltage pulse is generated by the inductive pickups and impressed on the input of the first stage of the amplifier, a voltage pulse is produced in the output of the second stage of the amplifier which is positive with respect to the grid voltage of that stage. While this voltage pulse output may be positive with respect to the grid voltage, it need not necessarily be positive with respect to ground. In this embodiment, the characteristics of the thyratrons used and the biasing connections to these thyratrons are such that they will be tripped by a voltage output from the amplifier which is slightly negative with respect to ground.

It is for this reason that the cathodes of the second amplifier stage are biased highly negative and the control grids of the stage are also negative. With a negative bias on the cathode it is possible to obtain a sufficient voltage differential between plate and cathode to achieve a negative with respect to ground voltage output from the amplifier. When no signal is generated by the pickups, the voltage of the plate circuit of the second amplifier stage is sufficiently negative so that the thyratron grids connected thereto are biased below ignition voltage.

Connection of the screen grids of the second amplifier stage to a point intermediate the plate resistances of the first stage effects control of plate voltage drift in the plate circuit of the second stage. This was described in detail in the explanation of the operation of the embodiment shown in Figs. 1 and 5. In addition, fluctuation of screen grid voltage is prevented by the condenser connected intermediate these grids and ground, see for example, condenser 356. Further stability of the plate voltage of the second amplifier stage is attained by bypassing thyratron grid kickback to ground. For example, for pentode 315, this is accomplished by condenser 355.

When the voltage of the thyratrons in the impulsing stage rises sufficiently to trip these thyratrons, and these thyratrons do trip, this raises the voltage of the respective thyratron cathodes and hence raises the voltage of the control grids of the thyratrons in the integration and output stage. All of the thyratron control grids 350, 385 and 386 are connected, through resistances, to junction point 411. Thus, control grid 350 is connected through resistances 377 and 378 to this junction point. Similarly control grid 385 is connected through resistance 379 to this junction point. And similarly control grid 386 is connected through resistances 381 and 380 to this junction point. In turn, junction point 411 is connected through resistances 369 and 371 to the negative side of battery 372. Thus all of these control grids of the thyratron in the integration and output stage are normally negative.

Since the cathodes of the thyratrons 331, 357 and 358, in the impulsing stage are connected, through resistances, to junction point 411, when these thyratrons conduct and their cathodes become highly positive, the voltage of junction point 411 is raised and in turn, the voltages of the thyratron grids 350, 385 and 386 are proportionately raised. When any one of the thyratrons in the integration and output stage conducts, it discharges the condenser shunted across the plate to cathode circuit of the tube and also completes a circuit to ground through the pen actuating coil connected thereto. This actuates the pen controlled by the pen actuating coil to produce a pen mark on the recording tape. As will be described, the integration resistance network is so arranged that individual, double, or triple pen marks can be obtained.

Assume that pickup 303 generates a positive voltage signal. This signal, if strong enough, will trip thyratron 358 hence raising the voltage of the cathode of that thyratron and hence causing the output voltage of the thyratron to be highly positive. Because of the connection of thyratron control grid 350 to the output resistor 365 of thyratron 358 through resistance 377 and lead 376, the potential of control grid 350 is proportionately raised to be less negative than it was previously. This causes thyratron 351 to trip and when this thyratron trips coil 400 is energized to actuate pen 403 and make a mark 406 on the movable recording tape 368. When thyratron 351 tripped it also discharged condenser 391. The time constant of this condenser is such that sufficient time elapses before it discharges completely to give enough time interval for pen 403 to act. At the end of this time interval, when condenser 391 is discharged, it effectively quenches thyratron 351. The result is the same if only pickup 302 generates a voltage signal since the output of thyratron 357 in the impulsing stage, which thyratron is in the channel fed by pickup 302, has a common connection at lead 376 with the output of thyratron 358.

When both pickups 302 and 303 simultaneously generate a positive voltage signal, both thyratrons in the impulsing stage, 357 and 358, trip and deliver a voltage signal, which is a raised voltage signal, to the integration and output circuit. Naturally, thyratron 351 in this circuit is tripped as before to actuate pen 403. However, thyratron 383 is also tripped. This is because the action of both thyratrons 357 and 358 raises the voltage output from these thyratrons more than if only one of them had acted alone and this raised voltage output is sufficient, being impressed through resistance 378 and resistance 379 on the control grid 385 of thyratron 383, to trip this thyratron. However, the raised voltage output is insufficient to trip thyratron 384 since additional resistances 380 and 381 are encountered before the control grid 386 is reached.

Inductive pickup 301, acting alone, will not actuate a pen. This is so because the resistance 363 in the output circuit of thyratron 331 in the impulsing stage is of a higher value than the comparable resistances 364 and 365. This higher value weakens the output signal from this thyratron to such an extent that, unaided, it is unable to deliver a strong enough signal to the junction point 411 to raise the voltage of any of the thyratron grids 350, 385 and 386 sufficiently to trip the thyratrons controlled by these grids.

However, inductive pickup 301 acting in conjunction with inductive pickup 302 will raise the voltage of junction point 411 sufficiently to trip thyratron 383 but not thyratron 384. When inductive pickup 302 acts, as has been previously explained, thyratron 351 is tripped and consequently pen 403 is actuated. The voltage output delivered by thyratron 357, acting in response to the signal generated by pickup 302, in addition to raising the voltage of control grid 350 and tripping thyratron 351 also tends to raise the voltage of control grids 385 and 386. As previously explained, when thyratron 357 acts alone the voltage rise on the last two grids mentioned is insufficient to trip the thyratrons controlled by these grids. However, when inductive pickup 301 simultaneously generates a signal with inductive pickup 302 and hence thyratrons 357 and 331 trip simultaneously, the output of thyratron 331 is added to that of thyratron 357 and this raises the voltage of control grid 385 sufficiently to trip thyratron 383. When thyratron 383 trips a circuit is completed from voltage source V34 through lead 410, coil 401, resistance 398, lead 395, and thyratron 383 to ground. Hence pen 404 is actuated to make a mark, simultaneously, with pen 403 and the marks 406 and 407 are produced. From this it can be seen that pickup pairs 301 and 302 or 302 and 303 will produce double pen marks on the recording tape. Pickups 301 and 303 do not act as a pair to produce a double pen mark because any magnetic condition strong enough to tend to make these pickups act as a pair would also cause pickup 302 to generate a voltage signal and a triple pen mark would be produced as will be next described.

When all three inductive pickups 301, 302 and 303 generate voltage signals strong enough to trip the respective thyratrons in the impulsing stage and in the channel connected to each of these pickups, the double strength voltage output signal feeding through lead 376 to the resistance network interconnecting the control grids of the thyratron 351, 383 and 384 is augmented by the voltage signal output of thyratron 331 which is superimposed upon this resistance network at junction point 411. Whereas the voltage signal reaching control grid 386 of thyratron 384 as a result of individual pickup action or the action of pairs of pickups was insufficient to trip this thyratron, the augmented voltage signal produced as a result of simultaneous signal generation by all three pickups is sufficient to raise the potential of control grid 386 sufficiently to trip thyratron 384. When this thyratron trips a circuit is completed from voltage source V34 through lead 410, coil 402, resistance 399, lead 396 and thyratron 384 to ground. Pen 405 is thus actuated to make a pen mark 408. Of course, the other two pens act simultaneously so that three pen marks are produced simultaneously on the movable recording tape 368.

Thus, with this embodiment, single, double and triple pen marks can be produced on the recording tape. For clarity of illustration, a single pen mark is illustrated at 406'', double pen marks are illustrated at 406' and 407', and triple pen marks are indicated at 406, 407 and 408. The test operator is enabled to get a better overall picture of the condition of the rail track and still has a distinguishable indication thoroughly warning him of the location of the more serious faults.

When a triple pen indication is received, thus producing a triple pen mark on the recording tape, it indicates that all three pickups have simultaneously passed through a region of flux density which causes them to generate a voltage. Since the pickups are of identical size and are positioned substantially abreast, with the pickups on top of the rail being spaced to span the width of the rail, they must necessarily have passed through a region of flux density which extends across the rail surface and to the gauge side of the rail transversely of the longitudinal axis of the rail, in other words, a peaked type of magnetic field with the summit of the peak or crest lying in the fissure plane as described heretofore in the specification. Also, as previously described, this type of magnetic condition is characteristic of transverse fissures but not of other defects. Hence, a triple pen indication indicates the presence of a relatively large transverse fissure.

A double pen indication indicates the presence of a transverse fissure located to one side or the other of the rail i. e. located on the side of the rail traveled by pickup 303 or located on the side of the rail traveled by pickup 302 and adjacent pickup 301. The magnetic condition produced by a fissure so located is, assuming a fairly small transverse fissure, strong enough to cause all three pickups to generate voltage signals. Thus, a small transverse fissure located on the side of the rail traveled by pickup 303 could produce a magnetic condition strong enough to cause this pickup and pickup 302 to generate a voltage signal and produce a double pen indication but would not be strong enough to cause pickup 301 to act concurrently. Also a small transverse fissure located on the gauge side of the rail could produce a magnetic condition which would cause pickups 301 and 302 to generate voltage signals and produce a double pen indication even though the magnetic condition would be too weak to cause pickup 303 to generate a voltage signal.

If only a single pen indication is produced this indicates that a defect, such as a wheel burn, exists in the half width of the top of the rail traveled by either pickup 302 or 303. Also, it is possible that a very small transverse fissure located in the half width of the top of the rail traveled by either pickup 302 or 303 could cause only the individual pickup passing over it to generate a voltage signal.

In order to obtain better fault indication selectivity and to facilitate interpretation by the test operator of the significance of single, double and triple pen indications, the individual channel sensitivities are preferably adjusted so that a triple pen indication is produced by magnetic conditions characteristic of 30% transverse fissures and up, a double pen indication is produced by magnetic conditions characteristic of transverse fissures in the 20–30% range and large wheel burns, particularly those with small transverse fissures located under the burn, and a single pen indication is produced by magnetic conditions characteristic of small sided transverse fissures less than 20% and smaller burns. Of course, this sensitivity range is merely illustrative and could be varied as desired.

With the apparatus just described, a high degree of differentiation between false indications and fissure indications can be attained. It is the fact that in all probability, a fissure will cause at least two, and normally three, channels to function simultaneously, whereas superficial defects will not cause such action, that constitutes a fundamental principle of this invention. It has been demonstrated in the laboratory that if small concentrated magnetic fields are synthetically induced at longitudinal spacings of more than 1/8", and these fields are spaced transversely across the rail so as to co-act with the different coils, sufficient integration of the separate impulses produced by the three channels is not produced to cause actuation of more than the pen 403 (the most sensitive of the three). If the synthetic magnetic fields are disposed in the same relative positions as before transversely of the rail, but are spaced apart longitudinally thereof less than ⅛″, a fissure condition is simulated and all three pens will indicate because the impulses produced by the several pickup coils are now within the time range of the integration circuits at 6 M. P. H. Hence, it is apparent from this illustration what is intended by the expression that the coils should be "substantially abreast of each other."

Although the summit of the peaked transverse region of intensified flux lies in the fissure plane, the peak top appears to have sufficient thickness to extend to either side of this plane enough so that the pickup core fronts do not have to be exactly in line. Even when the inductive pickups pass over a rail end and generate a signal as high as 10 volts, the amplifier recovers quickly and faults following the rail end as near as 4″ thereto will be indicated. By way of illustration, these results can be obtained using 6SJ7 pentodes in the amplifier and 884 thyratrons, and the following tabulated values of voltage, capacitance and resistance in which the voltages are indicated by the prefix V and are in single volt units, the capacitances are indicated by the prefix C and are in microfarad units, and the resistances are indicated by the prefix R and are in thousand ohm units:

| | |
|---|---|
| V30 | 28 |
| V31 | 6.2 |
| V32 | 200 |
| V35 | 45 |
| V34 | 175 |
| V372 | 22.5 |
| C313 | .1 |
| C316 | .02 |
| C355 | .02 |
| C356 | .05 |
| C333 | .02 |
| C375 | 20 |
| C391 | 3 |
| C392 | 3 |
| C393 | 3 |
| C409 | 45 |
| R318 | 1 |
| R321 | 150 |
| R322 | 100 |
| R323 | 750 |
| R412 | 100 |
| R377 | 1000 |
| R379 | 1000 |
| R381 | 1000 |
| R397 | 5 minus R of paint relay |
| R398 | 5 minus R of paint relay |
| R399 | 5 minus R of paint relay |
| Coils 400, 401, 402 | 1.7 each |
| R317 | 100 |
| R370 | 400 |
| R332 | 10 |
| R374 | 100 |
| R363 | 3000 |
| R364 | 2000 |
| R365 | 2000 |
| R378 | 150 |
| R380 | 150 |
| R382 | 1000 |
| R371 | 250 |
| R369 | 200 |
| R359 | 1000 |

*Summary*

In summary, it will be seen that whether the inductive pickups are positioned three substantially abreast atop the rail, two substantially abreast and spaced atop the rail, or three substantially abreast with two spaced atop the rail and one on the side of the ball of the rail, the positioning of the pickups substantially abreast makes concurrent signal generation by these pickups indicative of the presence of transverse fissure. By suitable adjustment of the overall individual channel sensitivities, all three embodiments of my invention can be made responsive, practically exclusively, to changed magnetic intensity regions corresponding to those produced by transverse fissures 20% or greater. With such an adjustment, the embodiments shown in Figs. 2 and 6 and Figs. 3 and 7, although producing plural pen marks on the recording tape, would be acting in the manner of the embodiment shown in Figs. 1 and 5. However, it is unnecessary to confine the scope of action of the embodiment shown in Figs. 2 and 6 and Figs. 3 and 7 to this single range of action for, from the description of the operation of these embodiments, it is seen that it is possible to get smaller fault indications and still obtain a really distinguishable indication indicative of the presence of larger transverse fissures.

While I have illustrated embodiments of my invention employing the inductive pickups arranged with their magnetic cores parallel to the longitudinal axis of the rail, in view of the fact that I have been assuming that the rail is energized by magnetizing it in its longitudinal direction to produce characteristic residual magnetic fields in the vicinity of flaws, it is to be understood that such a magnetic core arrangement does not exclude other magnetic core arrangements from the practice of my invention. Thus, if the rail is energized by electric current, as is done in the practice of the electroinductive system of rail flaw detection and the inductive pickups are located intermediate the electric current brushes, then the magnetic cores would be arranged transversely to the longitudinal axis of the rail. As is illustrated in Fig. 17, the pairs of spaced series connected bucking coils 415 and 415′, 416 and 416′, and 417 and 417′, in each pair of which individual coils are spaced in the longitudinal direction of the rail as shown, will be arranged so that the coils in each set of coils are positioned substantially abreast transversely of the longitudinal axis of the rail. Thus coils 415, 416 and 417 are substantially abreast transversely of the rail and coils 415′, 416′ and 417′ are substantially abreast transversely of the rail. With this positioning, if the coils simultaneously pass through a region of flux density sufficient to generate a voltage signal in each pair of coils, this indicates that the flux density region extends transversely of the rail which, as has been previously pointed out, is characteristic of the flux region above transverse fissure. While it is true that this flux region may not be as sharply defined as in the residual magnetism system because the center of current flowing through the rail may have a gradual change in position, nevertheless this change can be considered to be uniform across the width of the rail.

In the several embodiments of my invention which I have described, I have illustrated the inductive pickups as having a common connection and as being in parallel circuits. If only one amplifier was used as a common input for the inductive pickup outputs, said amplifier being selectively responsive to individual or joint pickup outputs or, where say three pickups were used, being selectively responsive to single, double or triple pickup outputs, then the pickups should be connected in series with the individual pickup outputs being cumulative i. e. they add to each other to produce a total response greater than the individual responses.

Accordingly, while I have described several particular embodiments of my invention, it is to be understood that I do not wish to be restricted thereto as that I intend to cover all modifications thereof which would be apparent to one skilled in the art and which come within the spirit and scope of the invention.

I claim:

1. Apparatus for detecting flaws in an elongated metallic body which has been energized to produce characteristic magnetic fields adjacent the body and in the vicinity of the flaws comprising a plurality of flux responsive devices positioned substantially abreast and adjacent said body, means to move said flux responsive devices simultaneously along said body and past the flaws, and means to convert responses from said flux responsive devices into recognizable form only when all of said flux responsive devices respond simultaneously.

2. Apparatus for detecting transverse fissures in a rail which has been energized to produce characteristic magnetic fields adjacent the rail and in the vicinity of the fissures comprising a plurality of inductive pickups positioned substantially abreast atop the rail and side by side substantially the width of the rail, means to move said pickups simultaneously along the rail and past the fissures, a multi-channel amplifier having as many channels as there are pickups, an individual connection between each pickup output and the corresponding amplifier channel input, a device for producing a standard impulse connected in each amplifier channel to the amplifier output, said impulse producing device being operably responsive to the amplifier channel output, an output circuit for each impulse producing device, an electrical network interconnecting said output circuits, and means including a connection between said electrical network and a fissure indicator actuator whereby individual or joint impulses from said impulse producing devices are impressed on said actuator, the latter being operably responsive to said impulses.

3. Apparatus for detecting transverse fissures in a rail which has been energized to produce characteristic magnetic fields adjacent the rail and in the vicinity of the fissures comprising a plurality of inductive pickups positioned substantially abreast atop the rail and side by side substantially the width of the rail, means to move said pickups simultaneously along the rail and past the fissures, a multi-channel amplifier having as many channels as there are pickups, an individual connection between each pickup output and the corresponding amplifier channel input, a device for producing a standard impulse connected in each amplifier channel to the amplifier output, said impulse producing device being operably responsive to the amplifier channel output, an output circuit for each impulse producing device, an electrical network interconnecting said output circuits, and means including a connection between said electrical network and a fissure indicator actuator whereby individual or joint impulses from said impulse producing devices are impressed on said actuator, the latter being operably responsive only to joint impulses.

4. Apparatus for detecting transverse fissures in a rail which has been energized to produce characteristic magnetic fields adjacent the rail and in the vicinity of the fissures comprising a plurality of inductive pickups positioned substantially abreast atop the rail and side by side substantially the width of the rail, means to move said pickup simultaneously along the rail and past the fissures, a multi-channel amplifier having as many channels as there are pickups, an individual connection between each pickup output and the corresponding amplifier channel input, a self-quenching thyratron connected in each amplifier channel to the amplifier output, said thyratron being biased close to its tripping point whereby a relatively small signal from said amplifier will cause the thyratron to trip, an output circuit for each thyratron, a resistance network interconnecting the output circuits of said thyratrons, means including a connection between said resistance network and the grid of a triode, said triode being biased to operate a fissure indicator actuator connected thereto only when joint thyratron outputs are impressed on the grid of said triode.

5. Apparatus for detecting transverse fissures in a rail which has been energized to produce characteristic magnetic fields adjacent the rail and in the vicinity of the fissures comprising a plurality of inductive pickups positioned substantially abreast atop the rail and side by side substantially the width of the rail, means to move said pickups simultaneously along the rail and past the fissures, a multi-channel amplifier having as many channels as there are pickups, an individual connection between each pickup output and the corresponding amplifier channel input, a self-quenching thyratron connected in each amplifier channel to the amplifier output, said thyratron being biased close to its tripping point whereby a relatively small signal from said amplifier will cause the thyratron to trip, an output circuit for each thyratron, a resistance network interconnecting the output circuits of said thyratrons, means including a connection between said resistance network and the grid of a triode, said triode being biased to trip a second thyratron connected thereto only when joint thyratron outputs from the self-quenching thyratrons are impressed on the control grid of said triode, and pen recording means operated by said second thyratron.

6. Apparatus for detecting transverse fissures in a rail which has been energized to produce characteristic magnetic fields adjacent the rail and in the vicinity of the fissures comprising a plurality of inductive pickups positioned substantially abreast atop the rail and spaced to extend substantially across the width of the rail and adjacent thereto, means to move said pickups simultaneously along the rail and past the fissures, a multi-channel amplifier, an individual connection from each inductive pickup output circuit to the corresponding amplifier input, a device for producing a standard impulse connected in each channel to the amplifier output and operably responsive thereto, each impulse producing device having an output circuit, an electrical network interconnecting each impulse producing device output circuit, and means including a connection between said network and a plurality of fissure indicator actuators whereby individual or joint impulses are impressed on said actuators, some of said actuators being operably responsive to individual impulses impressed thereon and all of said actuators being operably responsive to joint impulses impressed thereon.

7. Apparatus for detecting transverse fissures in a rail which has been energized to produce characteristic magnetic fields adjacent the rail and in the vicinity of the fissures comprising a pair of inductive pickups positioned substantially abreast atop the rail and spaced to extend substantially across the width of the rail and adjacent thereto, means to move said pickups simultaneously along the rail and past the fissures, a two-channel amplifier, a connection between the output circuit of one inductive pickup and the input of one amplifier channel and a connection between the output circuit of the other inductive pickup and the input of the other amplifier channel, a self-quenching thyratron connected in each amplifier output, said thyratron being biased close to its tripping point whereby a relatively small signal from the amplifier will trip the thyratron, a resistance network interconnecting the output circuits of said self-quenching thyratrons, a pair of triodes, each having connected to the output circuit thereof a second thyratron operably responsive thereto, individual connections between each triode grid and said resistance network whereby impulses from said resistance network are impressed on said grids, one of said triodes being operably responsive to individual impulses impressed on its grid and both of said triodes being operably responsive to joint impulses impressed on their respective grids, and a pair of pen recorders connected, respectively, to said second thyratrons and operably responsive thereto for recording fissures.

8. Apparatus for detecting transverse fissures in a rail which has been energized to produce characteristic magnetic fields adjacent the rail and in the vicinity of the fissures comprising a plurality of inductive pickups positioned substantially abreast, at least one of said pickups being located adjacent the side of the rail and the other pickups being located adjacent the top of the rail, means to move said pickups simultaneously along the rail and past the fissures, a multi-channel amplifier, an individual connection from each inductive pickup output circuit to the corresponding amplifier input, a device for producing a standard impulse connected in each channel to the amplifier output and operably responsive thereto, each impulse producing device having an output circuit, an electrical network, interconnecting each impulse producing device output circuit, and means including a connection between said network and a plurality of fissure indicator actuators whereby individual or joint impulses are impressed on said actuators, some of said actuators being operably responsive to individual impulses impressed thereon, and all of said actuators being operably responsive to joint impulses impressed thereon.

9. Apparatus for detecting transverse fissures in a rail which has been energized to produce characteristic magnetic fields adjacent the rail and in the vicinity of the fissures comprising three inductive pickups positioned substantially abreast, one of said pickups being adjacent a side of the rail and the other two pickups being adjacent the top of the rail and spaced to extend substantially across the width of the rail, means to move said pickups simultaneously along the rail and past the fissures, a tri-channel amplifier, each channel input thereof being connected to a pickup output circuit, an impulse producing thyratron connected in each channel to the amplifier output and operably responsive thereto, each of said thyratrons having an output circuit, a resistance network interconnecting the output circuit of said thyratrons to the control grids of a second group of three thyratrons, said control grids being biased so that one thyratron of the second thyratron group will trip upon receiving an impulse through the resistance network from an impulse producing thyratron fed by either of the pickups adjacent the top of the rail, two thyratrons of the second thyratron group will trip upon receiving impulses through the resistance network from pairs of impulse producing thyratrons, and all three thyratrons of the second thyratron group will trip upon receiving impulses through the resistance network from all three impulse producing thyratrons, and individual pen markers connected to each thyratron in the second group of thyratrons and operated when said thyratron trips to make a pen mark on a recording tape.

10. Apparatus for detecting flaws in an elongated magnetizable body which has been energized to produce characteristic magnetic fields adjacent the flaws comprising a plurality of flux responsive devices positioned substantially abreast and adjacent said body, means to move said flux responsive device along said body and past the flaws, means for converting responses received from each individual flux responsive device into one recognizable form, and means for converting simultaneous joint responses from said flux responsive devices into another recognizable form.

11. Apparatus for selectively detecting minor to medium and medium to major flaws in an elongated magnetizable body which has been energized to produce characteristic magnetic fields adjacent the body and in the vicinity of the flaws comprising a pair of flux responsive devices positioned substantially abreast atop the rail and spaced apart to extend substantially across the width of the rail, either of said flux responsive devices being responsive to the characteristic magnetic field in the vicinity of minor to medium flaws and both of said flux responsive devices being responsive jointly to the characteristic magnetic field in the vicinity of a medium to major flaw, means for moving both flux responsive devices simultaneously along the rail and past the flaws, means to record individual responses from either of said flux responsive devices, and means distinguishable from said first named means to record simultaneous joint responses from both of said flux responsive devices.

12. Apparatus for selectively detecting minor, medium and major flaws in a rail which has been energized to produce characteristic magnetic fields adjacent the rail and in the vicinity of the flaws comprising a pair of flux responsive devices positioned substantially abreast atop the rail and spaced from each other, either of said flux responsive devices being responsive to characteristic magnetic fields in the vicinity of minor flaws and both of said flux responsive devices being responsive jointly to characteristic magnetic fields in the vicinity of medium flaws, a third flux responsive device positioned adjacent a side of the rail and abreast of the other two flux responsive devices, said third flux responsive device being responsive jointly with one of the flux responsive devices atop the rail to characteristic magnetic fields in the vicinity of medium flaws and being responsive jointly with said pair of flux responsive devices atop the rail to characteristic magnetic fields in the vicinity of major flaws, means to move all three flux responsive devices simultaneously along the rail and past the flaws, and means to record distinguishably responses from individual flux responsive devices, simultaneous joint responses from pairs of flux responsive devices, and simultaneous joint responses from all three flux responsive devices.

13. In the detection of rail flaws, the method of integrating electrical impulses produced by a plurality of impulse circuits which consists in feeding individual impulses through a common connection to the control grid of an electronic tube, said tube being operably responsive only to impulses impressed upon the grid thereof simultaneously.

14. In the detection of rail flaws, the method of integrating electrical impulses produced by a plurality of impulse circuits which consists in feeding individual impulses through a common connection to a plurality of switch members, some of said switch members being operably responsive to individual impulses, and all of said switch members being operably responsive to impulses impressed thereon simultaneously.

15. In the detection of rail flaws, the method of selectively integrating electrical impulses produced by three impulse circuits which consists in feeding individual impulses through a common connection to three switch members, one of which is operably responsive to individual impulses, two of which are operably responsive to impulses from a pair of impulse circuits impressed thereon simultaneously, and all three of which are operably responsive to impulses from all of said impulse circuits impressed thereon simultaneously.

16. In a rail flaw detecting apparatus having a plurality of electrical impulse producing circuits, means to integrate the impulses produced thereby, said means comprising a common connection between said circuits, and a connection between said common connection and the control grid of an electronic tube operably responsive only to impulses from said impulse producing circuits impressed on the control grid thereof simultaneously.

17. In a rail flaw detecting apparatus having a pair of electrical impulse producing circuits, means to integrate the impulses produced thereby, said means comprising a common connection between said circuits, individual connections between said common connection and the control grids of a pair of triodes, one of said triodes being operably responsive to individual impulses from either of said impulse producing circuits, and the other of said triodes being operably responsive only to impulses from both of said impulse producing circuits impressed on the grid thereof simultaneously.

18. In a rail flaw detecting apparatus having three electrical impulse producing circuits, means to integrate the impulses produced thereby, said means comprising a common connection between said circuits, individual connections between said common connection and the control grids of three electronic tubes, one of said electronic tubes being operably responsive to individual impulses impressed upon the control grid thereof, a pair of said electronic tubes being operably responsive to impulses from two of said impulse producing circuits impressed upon the control grids thereof simultaneously, and all three electronic tubes being operably responsive to impulses from all three impulse producing circuits impressed upon the control grids thereof simultaneously.

19. The method of detecting in an elongated metallic body those flaws which have a particular alignment with respect to the longitudinal axis of said body which includes the steps of orienting a plurality of flux responsive devices to said alignment across at least a portion of said body, subjecting said body to an energizing force to set up a characteristic magnetic field in the vicinity of flaws, moving said devices along said elongated body, measuring the response from each of said devices against a predetermined standard, converting each of said responses which are at least equal to said standard into a standard impulse, integrating the standard impulses with respect to time to produce an integrated impulse, and measuring the strength of the integrated impulse against a predetermined standard to determine whether a plurality of devices have produced a standard response at substantially the same time.

20. The method of detecting transverse fissures in an elongated metallic body which consists in positioning a plurality of flux responsive devices in transverse alignment across at least a portion of said body, subjecting said body to an energizing force to set up a characteristic magnetic field in the vicinity of flaws, moving said devices along said elongated body, measuring the response from each of said devices against a predetermined standard, converting each of said responses which are at least equal to said standard into a standard impulse, integrating the standard impuses with respect to time to produce an integrated impulse, and measuring the strength of the integrated impulse against a predetermined standard to determine whether a plurality of devices have produced a standard response at substantially the same time.

21. Apparatus to detect flaws of a particular alignment in an elongated metallic body which has been energized to produce characteristic magnetic fields about the flaw, including a plurality of flux responsive devices positioned substantially abreast in the direction of said alignment and adjacent said body, means to move said flux responsive devices simultaneously along said body and past the flaws, a means for each of said devices and actuated in response to a signal of at least given strength from said device, and an indicating means connected to said last means and operable only in response to the simultaneous actuation of a plurality of said last means.

22. Apparatus to detect flows of a particular alignment in an elongated metallic body which has been energized to produce characteristic magnetic fields about the flaw, including a plurality of flux responsive devices positioned substantially abreast in the direction of said alignment and adjacent said body, means to move said flux responsive devices simultaneously along said body and past the flaws, and means for each of said devices and actuated to produce an impulse in response to a signal of at least a given strength from said device, means for integrating said impulses with respect to time, and indicating means responsive only to simultaneous impulses received by said flux responsive devices.

23. Apparatus to detect flaws of a particular alignment in an elongated metallic body which has been energized to produce characteristic magnetic fields about the flaw, including a plurality of flux responsive devices positioned substantially abreast in the direction of said alignment and adjacent said body, means to move said flux responsive devices simultaneously along said body and past the flaws, a self-quenching thyratron for each of said devices and actuated in response to a signal of at least given strength from said device, and an indicating means operable in response to the simultaneous actuation of a plurality of said thyratrons.

24. Apparatus to detect flaws of a particular alignment in an elongated metallic body which has been energized to produce characteristic magnetic fields about the flaw, including a plurality of flux responsive devices positioned substantially abreast in the direction of said alignment and adjacent said body, means to move said flux responsive devices simultaneously along said body and past the flaws, a means for each of said devices to amplify the signal from said device, a self-quenching thyratron for each of said devices and actuated in response to a signal of at least a given strength from said last-mentioned means, and an indicating means operable in response to the simultaneous actuation of a plurality of said thyratrons.

25. Apparatus to detect flaws of a particular alignment in an elongated metallic body which has been energized to produce characteristic magnetic fields about the flaw, including the plurality of flux responsive devices positioned substantially abreast in the direction of said alignment and adjacent said body, means to move said flux responsive devices simultaneously along said body and past the flaws, a self-quenching thyratron for each of said devices and actuated to produce an impulse in response to a signal of at least a given strength from the respective device, means for integrating said impulses with respect to time, a thyratron actuated by an impulse of predetermined strength from said integrating means, and indicating means actuated by the last-mentioned thyratron.

JOHN C. DIONNE.

REFERENCES CITED

The following references are of record in the file of this patent:

UNITED STATES PATENTS

| Number | Name | Date |
|---|---|---|
| 1,955,953 | Drake | Apr. 24, 1934 |
| 1,967,812 | Drake | July 24, 1934 |
| 2,113,785 | Drake et al. | Apr. 12, 1938 |
| 2,152,540 | Drake | Mar. 28, 1939 |
| 2,218,673 | Drake | Oct. 22, 1940 |
| 2,276,011 | Billstein | Mar. 10, 1942 |
| 2,297,879 | Drake | Oct. 6, 1942 |
| 2,317,721 | Barnes | Apr. 27, 1943 |
| 2,333,086 | Barnes et al. | Nov. 2, 1943 |
| 2,356,968 | Barnes et al. | Aug. 29, 1944 |
| 2,388,683 | Frickey et al. | Nov. 13, 1945 |